United States Patent Office 3,442,880
Patented May 6, 1969

3,442,880
SUSPENSION POLYMERIZATION PROCESS WHEREIN A SOLUBLE HYDROCARBON PHOSPHATE IS USED WITH A DIFFICULTLY SOLUBLE PHOSPHATE
Roy A. White, Somers, Conn., assignor, by mesne assignments, to Mobil Oil Corporation, New York, N.Y., a corporation of New York
No Drawing. Continuation-in-part of application Ser. No. 276,088, Apr. 26, 1963. This application Feb. 11, 1966, Ser. No. 526,691
Int. Cl. C08f 1/11
U.S. Cl. 260—93.5                                              12 Claims

ABSTRACT OF THE DISCLOSURE

A method is disclosed for producing bead polymers by suspension polymerization of monoethylenically unsaturated monomers in an aqueous medium containing a phosphate difficultly soluble in water. The polymerization is carried out in presence of a water-soluble hydrocarbon phosphate or salts thereof, in which the hydrocarbon portion is alkyl or aryl containing up to ten carbon atoms, in amount up to about 0.3% by weight of the total suspension to improve suspension stability and particle size control of the product beads.

---

This application is a continuation-in-part of U.S. application, S.N. 276,088, filed Apr. 26, 1963 (now abandoned), which in turn is a continuation-in-part of U.S. application, S.N. 50,842 filed Aug. 22, 1960 (now abandoned).

This invention relates to improved methods of producing polymeric materials in bead form.

Bead-shaped polymeric materials are generally produced in suspension polymerization. In this type of polymerization ethylenic monomers are dispersed or suspended in a medium such as water in the presence of a dispersing agent and a catalyst. The function of the dispersing agent is to stabilize such suspensions so that undesirable agglomeration of the polymerizing monomer is prevented whereby the polymer product is recovered in bead form of high molecular weight. Instability of dispersions results in agglomeration of the polymeric material into large beads of masses of low molecular weight. In general, suspension stability varies inversely with the bead size of the polymer produced.

Various difficultly soluble materials such as calcium, strontium and magnesium phosphates are widely used as dispersing agents in suspension polymerization. While under certain conditions these difficultly soluble phosphates stabilize suspensions and diminish the tendency of agglomeration of the polymerizing monomer, they are erratic in behavior complicating the problem of suspension stability and quality control. It is known that improved suspension stability is obtainable by employing suspension systems of low monomer-to-water ratio. Such suspensions, however, are uneconomical from the manufacturing standpoint and require relatively large amounts of catalysts to speed the polymerization through what is known as the "sticky" phase before agglomeration of the polymerizing particles. The use of large amounts of catalyst, however, results in too high polymerization rates which produce polymers of low molecular weight.

A solution to the problem of suspension stabilization now in general practice involves the use of anionic surface active agents which aid or enhance the dispersing properties of difficultly soluble phosphates. However, to be effective in stabilizing suspensions, surface active agents must be used in specific effective ranges of concentrations. Moreover the effective ranges of concentrations are relatively narrow and must be carefully controlled since in concentrations outside the effective ranges, the anionic surface active agents are ineffective. In fact, in too high concentrations they produce adverse effects, permitting the agglomeration of the polymerizing monomer. In addition, the valuable commercial practice of controlling the particle size distribution of the polymeric product by varying the amount of anionic surface active agent in suspension is difficult to accomplish since the ranges of concentrations of such materials are so narrow.

It is the principal object of this invention to provide means for stabilizing polymeric suspensions and controlling the particle size distribution of the polymeric product which is more effective and less critical than the means now available. It is another object of this invention to provide means for improving the effectiveness of difficultly soluble phosphates, in polymeric suspensions, in controlling bead size and bead size distribution of the polymeric rich phase during polymerization.

In accordance with the invention, a stabilizing or penetrating agent in the form of a rather weak detergent, is added to polymeric suspensions containing an inorganic dispersant. Suitable stabilizing or penetrating agents are water-soluble hydrocarbon acid phosphates and salts thereof. Particularly suitable are salts of such acid phosphates in which the hydrocarbon group may be an aryl group or alkyl group, and still more particularly, a hydrocarbon group of from one to ten carbon atoms. Particularly preferred are salts of acid alkyl phosphates of from two to four carbon atoms. Thus, there may be utilized the watersoluble hydrocarbon acid phosphates as well as their alkali metal salts, alkaline earth metal salts, ammonium- and amine salts, etc. and, more particularly, such salts that are water-soluble to the extent of the concentrations embodied herein based on the weight of the total dispersion. Examples include the Na, Li, Mg, K and Ca salts although, for purposes of illustration, the invention is described with particular emphasis on metal salts of propyl acid phosphates. Still other penetrating agents include the aforesaid metal salts of ethyl acid phosphates, butyl acid phosphates, isopropyl acid phosphates, octyl acid phosphates, and phenyl acid phosphates that imrove the stability of polymeric suspensions of embodied herein. For example, a number of tests conducted with salts of propyl phosphates in suspensions of various monomer compositions demonstrate their ability to improve the dispersing properties of difficultly soluble phosphates and control the particle size distribution. Since suspension stability varies inversely with the bead size of the polymer product, the stability achieved by the use of the soluble phosphates embodied herein was gauged by the particle size of the polymer produced.

The following formulation is illustrative of the improved process embodying this invention and in which the stabilizing or penetrating agent is sodium propyl phosphate.

|  | Parts by weight |
|---|---|
| Monomeric material | 45. |
|     Acrylonitrile, 13.5 gr. (70%) | |
|     Styrene, 31.5 gr. (30%) | |
| Water | 45. |
| Catalyst (lauroyl peroxide) | 0.45 (1.0% on the monomer). |
| $CaCl_2 \cdot 2H_2O$ (calcium chloride) | 0.24. |
| $Na_3PO_4 \cdot 12H_2O$ (trisodium phosphate) | 0.38. |
| Penetrating agent (sodium propyl phosphate) | Varying amounts from 0.05% to 0.3% on the total charge. |

The sodium propyl phosphate used for these illustrative examples was prepared by adding propyl phosphoric acid (a mixture of dipropyl hydrogen phosphate and dihydrogen monopropyl phosphate, commercially available from Hooker Electrochemical Co.) to water containing sodium hydroxide and the pH is adjusted to 7±0.2 by adding a caustic or acid as required.

A suitable container or reactor is charged with the water and sodium propyl phosphate, the trisodium phosphate is added and dissolved. The water is preferably heated to 60–70° C. and the calcium chloride (in water solution) is added. A fine dispersion of calcium hydroxyphosphate is thus obtained. The batch is preferably heated one hour at 60° C. and cooled to room temperature. The monomer composition and lauroyl peroxide catalyst are then added to the dispersion; the batch is preferably purged with nitrogen, and then heated to polymerization temperature (62° C., 16 hours for the example given).

As indicated by the following examples, in which a series of tests were conducted using varying amounts of propyl acid phosphate and certain salts thereof, it was found that suspension stability is, in certain cases, directly proportional to the quantity of penetrating agent used in the suspension. The following tests were conducted using the basic formulation set forth above with varying amounts of sodium propyl phosphate. In some tests chain transfer agents were employed to modify the molecular weight and other properties of the polymeric product. In some tests a dye was added to obtain better polymer color. The use of dyes and chain transfer agents in the examples are incidental to the suspending system herein discussed; however, such additives usually have only moderate influence on particle size. The polymeric bead product in the following examples was gauged on sieves of from 20–100 mesh—Tyler Standard Screens. The percentage of beads retained on each screen is listed for each run. The larger the percentage listed under the finer mesh sieves (40–100) and the pan (P), the greater is the suspension stability.

EXAMPLE I

Sodium propyl phosphate—.05% on the total charge resulted in a suspension having a final pH of 5.9.

Screen analysis of the polymeric beads

```
20 ------------------------------------------- .5
40 ------------------------------------------- 12
60 ------------------------------------------- 32
100 ------------------------------------------ 45
P ------------------------------------------- 13
```

EXAMPLE II

Sodium propyl phosphate—.061% on the total charge resulted in a suspension having a final pH of 5.9.

Screen analysis of the polymeric beads

```
20 ------------------------------------------- —
40 ------------------------------------------- 10
60 ------------------------------------------- 32
100 ------------------------------------------ 46.5
P ------------------------------------------- 12.5
```

EXAMPLE III

Sodium propyl phosphate—.072% on the total charge resulted in a suspension having a final pH of 5.9.

Screen analysis of the polymeric beads

```
20 ------------------------------------------- —
40 ------------------------------------------- 6.6
60 ------------------------------------------- 28
100 ------------------------------------------ 49.5
P ------------------------------------------- 17
```

EXAMPLE IV

Sodium propyl phosphate—.061%; chain transfer agent—.27 gram dodecyl mercaptan; final pH—6.55.

Screen analysis of the polymeric beads

```
20 ------------------------------------------- —
40 ------------------------------------------- .4
60 ------------------------------------------- 6.8
100 ------------------------------------------ 50
P ------------------------------------------- 45.2
```

EXAMPLE V

Sodium propyl phosphate—.061%; chain transfer agent—.18 gram dodecyl mercaptan; final pH—5.95.

Screen analysis of the polymeric beads

```
20 ------------------------------------------- —
40 ------------------------------------------- 3.5
60 ------------------------------------------- 5
100 ------------------------------------------ 32.5
P ------------------------------------------- 60
```

EXAMPLE VI

Sodium propyl phosphate—.061%; chain transfer agent—.09 gram dodecyl mercaptan; final pH—6.1.

Screen analysis of the polymeric beads

```
20 ------------------------------------------- —
40 ------------------------------------------- .5
60 ------------------------------------------- 4.6
100 ------------------------------------------ 40.7
P ------------------------------------------- 54
```

EXAMPLE VII

Sodium propyl phosphate—.061%; chain transfer agent—.045 gram tetraethylthiuram disulfide; final pH—5.85.

Screen analysis of the polymeric beads

```
20 ------------------------------------------- —
40 ------------------------------------------- —
60 ------------------------------------------- 1
100 ------------------------------------------ 16.5
P ------------------------------------------- 82.5
```

EXAMPLE VIII

Sodium propyl phosphate—.0755%; chain transfer agent—.025 gram "Yellow Ban" blue dye-marketed by American Stearin Co., used to prevent polymer yellowing; final pH—6.0.

Screen analysis of the polymeric beads

```
20 ------------------------------------------- —
40 ------------------------------------------- 3
60 ------------------------------------------- 25
100 ------------------------------------------ 64
P ------------------------------------------- 10.6
```

EXAMPLE IX

Sodium propyl phosphate—.0755%; chain transfer agents—.025 "Yellow Ban" and .09 gram dodecyl mercaptan; final pH—6.0.

Screen analysis of the polymeric beads

```
20 ------------------------------------------- 1
40 ------------------------------------------- 2.5
60 ------------------------------------------- 7.4
100 ------------------------------------------ 47
P ------------------------------------------- 41.2
```

EXAMPLE X

Sodium propyl phosphate—.0755%; chain transfer agents—.025 "Yellow Ban" and .09 gram tetraethylthiuram disulfide; final pH—5.94.

Screen analysis of the polymeric beads

| Mesh | % |
|---|---|
| 20 | 0.5 |
| 40 | 10 |
| 60 | 13.9 |
| 100 | 28.9 |
| P | 45.9 |

EXAMPLE XI

Sodium propyl phosphate—.0755%; chain transfer agents—.025 "Yellow Ban" and .9 alpha chloro toluene; final pH—5.45.

Screen analysis of the polymeric beads

| Mesh | % |
|---|---|
| 20 | — |
| 40 | 8.9 |
| 60 | 31 |
| 100 | 47.5 |
| P | 12 |

EXAMPLE XII

Sodium propyl phosphate—.0755%; chain transfer agents—.025 "Yellow Ban" and .9 dichloro acetone; final pH—4.8.

Screen analysis of the polymeric beads

| Mesh | % |
|---|---|
| 20 | 16.2 |
| 40 | 76.2 |
| 60 | 7 |
| 100 | 1 |
| P | — |

EXAMPLE XIII

Sodium propyl phosphate—.06%; chain transfer agents—.025 "Yellow Ban" and .0675 tetraethylthiuram disulfide; final pH—5.9.

Screen analysis of the polymeric beads

| Mesh | % |
|---|---|
| 20 | — |
| 40 | 3.8 |
| 60 | 6.6 |
| 100 | 37.5 |
| P | 53 |

EXAMPLE XIV

Sodium propyl phosphate—.06%; chain transfer agents—.025 "Yellow Ban" and .09 benzothiazyl disulfide; final pH—5.90.

Screen analysis of the polymeric beads

| Mesh | % |
|---|---|
| 20 | — |
| 40 | 4 |
| 60 | 27 |
| 100 | 49.5 |
| P | 21 |

EXAMPLE XV

Sodium propyl phosphate—.06%; chain transfer agents—0.25 "Yellow Ban" and .09 "Butyl Zimate" (zinc dibutyldithiocarbamate); final pH—6.05.

Screen analysis of the polymeric beads

| Mesh | % |
|---|---|
| 20 | — |
| 40 | .8 |
| 60 | 3.5 |
| 100 | 16.5 |
| P | 80 |

EXAMPLE XVI

Sodium propyl phosphate—.06%; chain transfer agents—.025 "Yellow Ban" and .0675 "Tetrone"; final pH—5.90.

Screen analysis of the polymeric beads

| Mesh | % |
|---|---|
| 20 | — |
| 40 | .8 |
| 60 | 4.5 |
| 100 | 23.5 |
| P | 72.5 |

EXAMPLE XVII

Sodium propyl phosphate—.06%; chain transfer agents—.025 "Yellow Ban" and .06 tetramethylthiuram monosulfide; final pH—6.00.

Screen analysis of the polymeric beads

| Mesh | % |
|---|---|
| 20 | 2.5 |
| 40 | 6.5 |
| 60 | 5.8 |
| 100 | 23.3 |
| P | 62 |

EXAMPLE XVIII

Sodium propyl phosphate—.06%; chain transfer agents—0.25 "Yellow Ban" and .072 tetraethylthiuram disulfide; final pH—6.30.

Screen analysis of the polymeric beads

| Mesh | % |
|---|---|
| 20 | — |
| 40 | 0.6 |
| 60 | 34.6 |
| 100 | 42.9 |
| P | 23.1 |

EXAMPLE XIX

Sodium propyl phosphate—.06%; auxiliary polymerization accelerator—.03 gram sodium acetate trihydrate-chain transfer agents—.025 "Yellow Ban" and .072 tetraethylthiuram disulfide; final pH—6.45.

Screen analysis of the polymeric beads

| Mesh | % |
|---|---|
| 20 | — |
| 40 | — |
| 60 | 0.9 |
| 100 | 16.5 |
| P | 83.8 |

EXAMPLE XX

Sodium propyl phosphate—.06%; chain transfer agents—.025 "Yellow Ban," and .0675 potassium sulfide; final pH—6.80.

Screen analysis of the polymeric beads

| Mesh | % |
|---|---|
| 20 | — |
| 40 | 13 |
| 60 | 24.1 |
| 100 | 23.6 |
| P | 40 |

EXAMPLE XXI

Sodium propyl phosphate—.06%; chain transfer agents—.025 "Yellow Ban" and .090 CS$_2$; final pH—6.35.

Screen analysis of the polymeric beads

| Mesh | % |
|---|---|
| 20 | — |
| 40 | 1.5 |
| 60 | 19.1 |
| 100 | 45.5 |
| P | 34.5 |

In Examples XXII–XXVII listed below the charge tested included sodium propyl phosphate in varying amounts from 0.1% to 0.278%; chain transfer agents—.025 "Yellow Ban" and .0675 tetraethylthiuram disulfide.

| Example | Percent sodium propyl phosphate on total charge | 20 | 40 | 60 | 100 | P |
|---|---|---|---|---|---|---|
| XXII | 0.1 | | 3.5 | 17.5 | 19 | 59.5 |
| XXIII | 0.11 | | | 1 | 11 | 88 |
| XXIV | 0.122 | | 3.5 | 3 | 12.5 | 81.5 |
| XXV | 0.167 | 32 | 3.5 | 2.5 | 4.5 | 56.5 |
| XXVI | 0.222 | 30 | 12.5 | 3.5 | 3 | 51 |
| XXVII | 0.278 | 46.5 | 3 | 2.3 | 3 | 44 |

The effective range of sodium propyl phosphate for stabilizing suspensions is in an amount up to about 0.3% on the total charge and, more specifically, from 0.05 to 0.3%. For phosphates as embodied herein in which the hydrocarbon group is other than propyl or isopropyl, as for example, a hydrocarbon group containing increasingly more than three carbon atoms, the concentrations may be lower than 0.05% such as down to 0.02% and, in some instances, even lower. Such a range is much greater than for materials now generally used for stabilizing and controlling polymeric suspensions.

The following examples indicate the relative stability of the suspensions with varying pH.

| Example: | pH |
|---|---|
| VIII | 6.0 |
| XI | 5.45 |
| XII | 4.8 |
| XIII | 5.9 |
| XVIII | 6.30 |
| XX | 6.80 |

The screen analyses of the beads obtained from these runs indicates that suspensions utilizing the hydrocarbon phosphates embodied herein as a stabilizer are relatively insensitive to changes in pH. In suspension systems now generally used, copolymers of styrene usually agglomerate at pH values of around 5.5. Furthermore, it was found that a penetrating agent such as sodium propyl phosphate exerts a buffering action on the suspensions, acting to stabilize the pH. However, in monomer systems which include acid liberating monomers such as vinyl chloride additional buffering agents may be used such as oxides or hydroxides of magnesium, calcium, barium and zinc.

Examples such as II, VI, XIII, XIX and XX indicate that various additives and chain transfer agents such dodecyl mercaptan, tetraethyl thiuram disulfide, and sodium acetate may be used with the phosphates embodied herein with improved particle stability.

The examples listed below demonstrate the stabilizing properties of other phosphates such as the lithium, magnesium, potassium, and calcium salts as well as the acid propyl phosphate itself. The charge employed in these examples is the same is used in the previous example except that the monomer is styrene and the catalyst is benzoyl peroxide (0.25%). In the following examples, propyl phosphate equivalent to 0.05% sodium propyl phosphate was used.

| Example | Propyl phosphate | 20 | 40 | 60 | 100 | P |
|---|---|---|---|---|---|---|
| XXVIII | Li | | | 8 | 58 | 34.5 |
| XXIX | Mg | | 0.5 | 3 | 41.5 | 55 |
| XXX | K | | | 3.5 | 50 | 46.5 |
| XXXI | Ca | | | 9.5 | 60 | 30.5 |
| XXXII | H | 2 | 30.5 | 54 | 13 | 1 |

The following tests were made with varying copolymer compositions in sodium propyl phosphate/calcium hydroxy phosphate stabilized suspension systems:

EXAMPLE XXXIII

Copolymer composition—styrene 80% and acrylonitrile 20); chain transfer agent—0.10% tetraethylthiuram disulfide; final pH 6.25.

Screen analysis of the polymeric beads

| 20 | — |
|---|---|
| 40 | — |
| 60 | 26.6 |
| 100 | 38.5 |
| P | 35.5 |

EXAMPLE XXXIV

Monomer—styrene 100%; catalyst—0.25% benzoyl peroxide, penetrating agent—.05% sodium propyl phosphate, polymerization temperature 95° C.

Screen analysis of the polymeric beads

| 20 | — |
|---|---|
| 40 | — |
| 60 | 6.5 |
| 100 | 51 |
| P | 42.5 |

EXAMPLE XXXV

Monomer—70% styrene, 30% acrylonitrile, catalyst—1.0% lauroyl peroxide, penetrating agent—0.11% sodium propyl phosphate, polymerization temperature 62° C.

Screen analysis of the polymeric beads

| 20 | — |
|---|---|
| 40 | — |
| 60 | 1 |
| 100 | 11 |
| P | 88 |

EXAMPLE XXXVI

Monomer composition—45% styrene, 25% alpha methylstyrene, 30% acrylonitrile, catalyst—1.0% lauroyl peroxide, penetrating agent—0.05% sodium propyl phosphate, polymerization temperature 62° C.

Screen analysis of the polymeric beads

| 20 | 0.5 |
|---|---|
| 40 | 1.5 |
| 60 | 9.5 |
| 100 | 48 |
| P | 40.5 |

EXAMPLE XXXVII

Monomer composition—100% methyl methacrylate, catalyst—1.0% benzoyl peroxide, penetrating agent—.056% sodium propyl phosphate, polymerization temperature 85° C.

Screen analysis of the polymeric beads

| 20 | — |
|---|---|
| 40 | 12 |
| 60 | 14 |
| 100 | 47.5 |
| P | 26.5 |

Based on the screen analyses of the polymer beads produced in the above tests, it can be seen that sodium propyl phosphate/calcium hydroxy phosphate suspensions are relatively insensitive to changes in monomer composition.

While the examples previously given in this application involved the use of calcium hydroxy phosphate as the difficultly soluble dispersing agent, the following examples demonstrate that other metal hydroxy phosphates are also suitable.

In the following examples the metals listed below were substituted for the calcium in calcium hydroxy phosphate with the following results:

| Example | Metal hydroxy phosphate | 20 | 40 | 60 | 100 | P |
|---|---|---|---|---|---|---|
| XXXVIII | Mg | 64.5 | 8.5 | 12 | 11.5 | 3.5 |
| XXXIX | Sr | | 0.5 | 5 | 21.5 | 63 |

While in the examples listed above equal parts of water and monomer were used the following examples indicate that the reactor may be charged with more styrene than water without adversely effecting the stability of the suspension system:

| Example | Styrene/water ratio | 20 | 40 | 60 | 100 | P |
|---|---|---|---|---|---|---|
| XL | 50/50 | | | 6.5 | 51 | 42.5 |
| XLI | 54.5/45.5 | | 0.5 | 5.5 | 45 | 45 |

The use of the soluble hydrocarbon phosphates as stabilizing or penetrating agents for metal hydroxy phosphate suspension have the following advantages: (1) relatively insensitive to changes in pH; (2) variations in copolymer compositions and monomer to water ratios have no substantial effect on suspension stability, (3) relatively high concentrations of the hydrocarbon phosphates may be employed without adverse effect and in fact exert a buffering action on suspensions; and (4) a relatively wide range (e.g., 0.02 or lower up to 0.3%) of the phosphates may be used without adverse effect on the suspension stability thereby providing less cirtical and more effective means of stabilizing suspensions.

Additional runs were carried out by polymerizing styrene in a monomer:water ratio of 1:1 with use of 0.5% calcium hydroxy phosphate based on the total system as the dispersing agent and, with use of sodium phenyl phosphate in amounts of 0.04 and 0.08% by weight of the total suspension. The suspensions from such systems were highly stable with production of highly suitable polymer beads. Similar results were obtained from such a suspension system but with use of sodium butyl phosphate in a concentration of 0.02% by weight of the total suspension.

The process of the present invention is applicable to suspension polymerization of any polymerizable ethylenic monomer, i.e., any ethylenic compound polymerizable under conditions of suspension polymerization, with or without catalysts, including those of the peroxide type at atmospheric, subatmospheric or superatmospheric pressures. Furthermore, the process embodied herein can be used for combinations of a plurality of polymerizable monomers. More specifically, the process embodied herein is useful for polymerizafition of vinyl aromatic monomers, such as styrene, substituted styrene, and compounds of unsaturated organic type containing a $CH_2{:}C{<}$ group and capable of polymerization in a suspension system as embodied herein. Thus, specific examples of suitable polymerizable substances include alpha methyl styrene, methyl methacrylate, acrylonitrile, styrene, and mixtures thereof.

In reference to the metal salts of hyrocarbon acid phosphates embodied for use in practice of this invention, they, in general, can be prepared in a manner, similar to that described hereinbefore for preparation of sodium propyl phosphate, by addition of an appropriate hydrocarbon hydrogen phosphate or mixtures of a hydrocarbon dihydrogen phosphate and a dihydrocarbon monohydrogen phosphate to an aqueous hydroxide of an appropriate metal (e.g. an alkali metal, alkaline earth metal).

What is claimed is:

1. In a process for producing bead polymers by suspension polymerization of a monoethylenically unsaturated monomer in an aqueous medium containing a phosphate difficultly soluble in water, the improvement which comprises incorporating into said aqueous medium a water-soluble hydrocarbon acid phosphate in an amount up to about 0.3% by weight of the total suspension to improve suspension stability, said hydrocarbon phosphate being characterized in that the hydrocarbon portion thereof is a hydrocarbon selected from the group consisting of alkyl and aryl groups of up to ten carbon atoms.

2. In a process for producing bead polymers by suspension polymerization of a monoethylenically unsaturated monomer in an aqueous medium containing a phosphate difficulty soluble in water, the improvement which comprises incorporating into said aqueous medium a salt of a water-soluble hydrocarbon phosphate in an amount up to about 0.3% by weight of the total suspension to improve suspension stability, said hydrocarbon phosphate being characterized in that the hydrocarbon portion thereof is a hydrocarbon selected from the group consisting of alkyl and aromatic groups of up to ten carbon atoms.

3. Process, as defined in claim 2, in which the salt is used in an amount of from 0.05 to 0.3% by weight of the total suspension.

4. Process, as defined in claim 2, in which the salt is an alkali metal salt of an alkyl acid phosphate.

5. Process, as defined in claim 4, in which the salt is a sodium salt of propyl acid phosphate.

6. Process, as defined in claim 2, in which the salt is a sodium salt of propyl acid phosphate and is used in an amount of 0.05 to 0.3% by weight of the total suspension.

7. Process, as defined in claim 2, in which the difficultly soluble phosphate is a calcium phosphate, the salt is a sodium salt of propyl acid phosphate, and the sodium salt is used in an amount of from 0.05 to 0.3% by weight of the total suspension.

8. A process, as defined in claim 1, in which the suspension contains, by weight, at least about one part of water per part of the ethylenic monomer.

9. A process, as defined in claim 1 in which the ethylenic monomer is styrene.

10. A process, as defined in claim 1 in which the ethylenic monomer is styrene, the difficultly soluble phosphate is a calcium phosphate, and the water-soluble phosphate is propyl acid phosphate in an amount of 0.05 to 0.3% by weight of the total suspension.

11. A process, as defined in claim 1, in which the water soluble material is added to the aqueous medium as the sodium salt of a mixture of dihydrogen monopropyl phosphate and dipropyl hydrogen phosphate.

12. A process, as defined in claim 1, in which the soluble phosphate is an aryl acid phosphate.

References Cited

UNITED STATES PATENTS

| | | | |
|---|---|---|---|
| 2,656,372 | 10/1963 | Ernst et al. | 260—461.314 |
| 2,687,408 | 8/1954 | Grim. | |
| 3,100,763 | 8/1963 | Meek et al. | |

JAMES A. SEIDLECK, *Primary Examiner.*

U.S. Cl. X.R.

260—80.78, 85.5, 86.7, 88.7, 89.5